United States Patent [19]

Prest, Jr. et al.

[11] 4,095,020

[45] June 13, 1978

[54] PROCESS FOR CONTROLLED PHASE TRANSFORMATION OF ALPHA PHASE OF POLY(VINYLIDENE FLUORIDE) TO THE GAMMA PHASE

[75] Inventors: William M. Prest, Jr., Webster; David J. Luca, Marion, both of N.Y.

[73] Assignee: Xerox Corporation, Stamford, Conn.

[21] Appl. No.: 772,069

[22] Filed: Feb. 25, 1977

[51] Int. Cl.² ............................................. C08F 6/00
[52] U.S. Cl. ................................. 528/494; 260/827; 260/33.2 R; 260/33.2 SB; 428/421; 526/255; 528/481
[58] Field of Search ......................................... 528/494

[56] References Cited

U.S. PATENT DOCUMENTS

| | | | |
|---|---|---|---|
| 2,425,755 | 8/1947 | Roberts et al. | 260/615 |
| 2,448,664 | 9/1948 | Fife et al. | 260/615 |
| 2,834,748 | 5/1958 | Bailey et al. | 260/42 |
| 3,600,418 | 8/1971 | Bailey et al. | 260/448.8 R |
| 3,629,310 | 12/1971 | Bailey et al. | 260/448.8 R |
| 3,701,749 | 10/1972 | Segawa et al. | 260/41 C |
| 3,850,900 | 11/1974 | Segawa | 260/92.1 |

*Primary Examiner*—Stanford M. Levin

[57] ABSTRACT

Process for controlled phase transformation of powders and films of the alpha phase of poly(vinylidene fluoride) to the corresponding gamma phase. The materials prepared according to this process possess enhanced electret behavior in comparison to the more prevalent forms of this polymer commonly referred to as the alpha and beta phases. Such enhancement is achieved by impregnation of the alpha phase of poly(vinylidene fluoride) with certain phase transformation agents, followed by heating of the impregnated material in a controlled manner. The agents which have been impregnated into the polymer can later be removed subsequent to phase transformation by solvent extraction techniques. The gamma form of poly(vinylidene fluoride) prepared in the above manner can be used as electrets.

2 Claims, 5 Drawing Figures

PROCESS FOR CONTROLLED PHASE TRANSFORMATION OF ALPHA PHASE OF POLY(VINYLIDENE FLUORIDE) TO THE GAMMA PHASE

BACKGROUND OF THE INVENTION

1. Field of the Invention

This invention relates to a process and articles prepared thereby. More specifically, this invention is directed to the enhancement in electret behavior of poly(vinylidene fluoride) by phase transformation of said polymer from the alpha to gamma form, and the utilization of such materials in sound production and transmission devices.

2. Description of the Prior Art

The existence of at least two crystalographic phases of poly(vinylidene fluoride) has been apparent since the initial studies of this polymer. Crystallization from the melt was found to produce spherulites of the alpha ($\alpha$) phase in which the chain backbone assumes a trans-gauche-trans-gauche' (TGTG') conformation. The orientation of these melt crystallized samples transform the TGTG' alpha phase crystals to a planar zig-zag conformation called the beta ($\beta$) phase. This beta phase can also be formed by casting from selected solvents and by high pressure crystallization methods.

In addition to the alpha and beta phases, several investigators have suggested the existence of a third polymorph of poly(vinylidene fluoride); although, the evidence that has been offered to confirm the existence of this proposed gamma ($\gamma$) phase is both sparce and inconclusive. Cortili and Zerbi were the first to suggest the possibility of this third phase on the basis of small changes in the ir spectra of differently prepared samples of the zig-zag phase. Doll and Lando subsequently found that high pressure crystallization of poly(vinylidene fluoride) produced a material with a melting point 25° C above what has been previously observed for either the alpha or beta phase, *J. Macromol. Sci. Phys.* 2(2), 219 (1968).

Subsequent work by Gal'Perin et al described the preparation of a new polymorph of poly(vinylidene floride). They found that films cast from dimethylformamide or dimethylsulfoxide yielded the new gamma phase and that a more developed form of this polymorph could be obtained by annealing these films at 458° K. They also noted that this phase could be made by melt crystallizing low molecular weight ($\overline{Mn} < 10^5$) poly(vinylidene fluoride) between 443° and 458° K. Attempts to orient this gamma form triggers a transformation to the beta phase similar to the strain induced alpha to beta transition. This observation is consistent with the results of Doll and Lando on oriented pressure crystallized poly(vinylidene fluoride) and suggests that they were successful in their original attempt to produce the gamma phase of poly(vinylidene fluoride).

It has also been previously shown that the slow growth rate associated with high temperature crystallization permit concurrent formation of a different phase of poly(vinylidene-fluoride) *J. App. Phys.* 46 (10), 4136 (1975). These slow crystallizations are shown to produce unique morphological structures with unusual melting behaviors. It has also been shown that a time-and-temperature-dependent crystal transition from the alpha to the gamma phase form can be induced in a high temperature crystallization region to produce spherulites which melt 15°–20° K above the melting point of the original alpha phase. This latter transformation exhibits nucleation and propagation characteristics which in some regions can compete with the normal growth of the alpha phase to produce unique "wagon wheel" spherulitic structures.

The prior art also discloses the addition of certain additives to poly(vinylidene fluoride) to control and/or eliminate the formation of large spherulites within this polymer, U.S. Pat. Nos. 3,701,749 and 3,850,900. Since both of the above patents deal with crystallization of this polymer by conventional techniques, only the alpha form of the polymer is produced.

In all the prior art processes described in the articles referred to hereinabove, the preparation of the gamma phase of poly(vinylidene fluoride) requires resort to elaborate process conditions which involve extended reaction time. Even when these conditions are satisfied, the yield is often extremely low. Accordingly, it is the object of this invention to remedy the above, as well as related, deficiencies in the prior art methods for preparation of gamma poly(vinylidene fluoride).

More specifically, it is the principle object of this invention to provide a process for rapid and efficient conversion of the alpha form of poly(vinylidene fluoride) to its corresponding gamma phase.

It is another object of this invention to provide a process for the conversion of the alpha and/or beta form of poly(vinylidene fluoride) to its corresponding gamma phase at higher yields than available in prior art systems.

It is yet another object of this invention to provide a process for the conversion of the alpha form of poly(vinylidene fluoride) to its corresponding gamma phase without resort to elaborate process conditions or extended reaction times.

Still yet another object of this invention is to provide a process for reduction in the alpha phase in poly(vinylidene fluoride) samples.

Additional objects of this invention include the utilization of the gamma form of poly(vinylidene fluoride) as electrets in sound production and sound transmission devices.

SUMMARY OF THE INVENTION

The above and related objects are achieved by providing a process for the phase transformation of the alpha form of poly(vinylidene fluoride) to the corresponding gamma phase. According to this process, alpha poly(vinylidene fluoride) is intimately associated with a phase transformation catalyst and thereafter heated to a temperature sufficient to cause melting of the alpha phase of the polymer. According to this process, alpha poly(vinylidene fluoride) ($PVF_2$) is intimately associated with a phase transformation agent (PTA). Such association can be effected prior to or concurrent with heating of the polymer. These materials are heated to a temperature approximately 30K° below the point at which substantially all of alpha phase of the polymer is melted. Heating of the polymer is continued at a rate of less than about 5K°/minute through the melt region of the alpha phase of the polymer. It is both critical and essential to the successful operation of this process that the heating be controlled with sufficient precision to prevent the temperature from rising in excess of the specified rate or to a temperature about 5K° in excess of the peak endotherm of the alpha phase, as measured at 10K° per minute by standard differential scanning calorimetry. Subsequent to completion of the heating phase of this process the polymer is allowed to cool sufficiently to result in its recrystallization to the gamma phase. The polymer can be repeatedly recycled, with additional phase transformation agent added as required until substantially all of the alpha phase of the polymer has been converted to the gamma phase.

DESCRIPTION OF THE INVENTION INCLUDING PREFERRED EMBODIMENTS

The alpha poly(vinylidene fluoride) utilized in the process of this invention can be obtained commercially or prepared by conventional polymerization techniques from readily available vinylidene fluoride monomers. The manner in which the phase transformation agent (PTA) is intimately associated with the alpha poly(-vinylidene fluoride) is not believed to be critical to this invention. It has been found, however, that the more porous forms of the polymer are preferred since they permit more intimate and complete contact of the PTA and the alpha phase of the polymer. The amount of PTA associated with the polymer is not critical to the phase transformation process. The phase transformation of the alpha form of the polymer to its corresponding gamma phase is, however, not self-propagating and thus does require that the PTA be present in those regions of the polymer where such conversion is desired. This apparent limitation in the process does have certain distinct advantages. For example, it is possible to selectively imbibe the PTA into a film of alpha poly(vinylidene fluoride) by masking certain areas of the film so as to preclude interpenetration of the PTA. Thus, when the film is subjected to the process of this invention, phase transformation of the film from the alpha to the gamma phase is limited to those areas which are in contact with these agents whereas the remainder of the film remains substantially unchanged.

Phase transformation agents which are suitable for use in the process of this invention are the organo-modified silicones and copolymers of silicones and organics that are typically used as antistats, dispersants, emulsifiers, cellular foam stabilizers and surfactants.

Representative of the phase transformation agents suitable for use in this process are block copolymers having a siloxane segment and an oxyalkylene segment. The preferred phase transformation agents useful in the process of this invention are disclosed in U.S. Pat. No. 2,834,748 which is hereby incorporated by reference in its entirety.

The siloxane segment of the block copolymers of the '748 patent is composed of at least one trifunctional silicon atom bonded to three oxygen atoms and a single monovalent hydrocarbon radical. These difunctional silicon atoms are bonded through oxysilicon bonds to the trifunctional silicon; these same difunctional silicones being further modified by having two monovalent hydrocarbon radicals bonded thereto.

The oxyalkylene segment of the block copolymers of the '748 patent is composed of at least five oxyalkylene groups bonded to one another by oxycarbon bonds and to the siloxane segment of the block copolymer through a carbon-oxy-silicon. The opposite end of the oxyalkylene segment is capped by a monoether radical.

These block copolymers can be prepared by reacting a polyalkoxy polysiloxane with a monohydroxyl polyoxyalkylene monoether under exchange reaction conditions wherein at least some of the alkoxy groups attached the polysiloxane are replaced by polyoxyalkylene monoether radicals, resulting in the removal of the alkoxy groups as the corresponding alkanols.

The polyalkoxy polysiloxanes suitable for use in the synthesis of these copolymers can themselves be prepared by reacting a lower molecular weight polysiloxane with a trialkoxysilane under the appropriate conditions.

The monohydroxy polyoxyalkylene mono-ethers suitable for use in the synthesis of these copolymers must themselves possess a minimum chain length to effectively achieve the objectives of this invention. The requirements of this invention are satisfactorily met were the chain length of the polyoxyalkylene is comprised of a minimum of five oxyalkylene groups (which is essential to exert significant influence on the relative solubility and lubricity of the block copolymers).

Monohydroxy polyoxypropylene monoethers suitable for use in the synthesis of a PTA for the process of this invention, are described in U.S. Pat. Nos. 2,448,664 and 2,425,755.

Siloxane oxyalkylene block copolymers formed from the aforedescribed materials can be represented by the following formula where x is the number of trifunctional silicon atoms bonded to a single monovalent or multivalent hydrocarbon radical, R′;

a is the number of poly(oxyalkylene) segments in the block copolymer;

y is an integer having a value of at least 3 and denotes the number of difunctional siloxane units n is an integer from 2 to 4 denoting the number of carbon atoms in the oxyalkylene group;

z is an integer having a value of at least 5 and denotes the length of the oxyalkylene chain.

It is understood that R and R″ represent monovalent hydrocarbon radicals such as alkyl, aryl and aralkyl and R″ terminates the polyoxyalkylene chain as a monoether. R‴ can be an alkyl radical or a radical of the formula, R$_3$Si—, where R is the same as previously defined. R′ represents a monovalent or polyvalent hydrocarbon radical (being monovalent when x = 1; divalent when x = 2; trivalent when x = 3; and tetravalent when x = 4. It is understood from the above formula that at least one oxyalkylene chain is joined to the siloxane segment through a Si—O—C bond, and that when a = 1 and x = 1, there are two alkyl or R$_2$Si — (R‴ groups) terminating the siloxane chains. However, when $a = 3$ and $x = 1$, there are no R''' groups.

U.S. Pat. No. 3,629,310 (which is hereby incorporated by reference in its entirety) also describes a series of organo-siloxane-oxyalkylene block copolymers which are also suitable for use as phase transformation agents in the process of this invention. The materials described in the '310 patent differ from those of the '748 patent in that one end of the siloxane segment of the block copolymer is linked to an oxyalkylene segment and the other end of the silxane segment is linked to (1) another oxyalkylene segment, (2) a trihydrocarbonsiloxy group, or (3) an alkoxy group while each oxyalkylene group is linked at one end to a siloxane segment and at the other end to (1) another siloxane segment, (2) a hydroxyl group or (3) a trihydrocarbonsiloxy group.

The materials of the '310 patent can also form highly cross-linked structures. This tendency to cross-link is prevalent when the siloxane segment of the copolymer contains only tri-functional silicon atoms and oxyalkylene blocks linked to each end of the siloxane segment and at the other end (of the oxyalkylene segment) (1) another siloxane segment, (2) a monovalent hydrocarbon, (3) a trihydrocarbon siloxy group or (4) a hydroxyl group.

A third class of block copolymers suitable as phase transformation agents for the process of this invention are described in U.S. Pat. No. 3,600,418 (which is hereby incorporated by reference in its entirety). These block copolymers comprise at least one siloxane segment and at least one oxyalkylene segment.

Each siloxane segment of this copolymer is (a) composed of difunctional silicone atoms of difunctional silicone atoms and at least one trifunctional silicone atom, joined to one another through a silicon-oxygen-silicon bond, each difunctional silicon of this segment being linked to two monovalent hydrocarbon groups and two oxygen atoms and each trifunctional silicon atom being linked to a hydrocarbon group and three oxygen atoms; and (b) is linked at one end to an oxyalkylene segment by a carbon-oxygen-silicon bond and at all other ends to a member selected from the group consisting of (1) another of said oxyalkylene segments by a carbon-oxygen-silicon bond, (2) a trihydrocarbonsiloxy group and (3) and an alkoxy group.

Each oxyalkylene segment of this copolymer is (a) composed of at least five oxyalkylene units joined together by carbon-oxygen-carbon bonds and (b) is bonded at one end to the siloxane segment of the copolymer through a carbon-oxygen-silicon bond and at the other end to either (1) another siloxane segment by a carbon-oxygen-silicon bond or (2) a hydroxyl group, with the proviso that at least one of the oxyalkylene segments of the copolymer has a terminal hydroxyl group.

It is believed, with reasonable certainty, that the "Organo-Modified Silicones" available from Union Carbide Corporation (the assignee of U.S. Pat. Nos. 2,834,748; 3,629,310 and 3.600,418) are essentially the same type of materials referred to hereinabove. Phase transformation agents which have been found especially suitable for use in the process of this invention are Union Carbide Organo-Modified Silicone type L-520, L-522, L-7607, L-7002 and L-720 (listed in order of decreasing preference).

The phase transformation agent can be associated with the poly(vinylidene fluoride) $PVF_2$ powder or film by any of several techniques. It can be mixed with the powder or coated on the film in its as received, undiluted state. It can be coated directly on the surfaces of the molds or rolls used to produce parts on films. It can be coated on articles and powders from a solution of the agent in a non-solvent for the polymer (such as methanol). The agent may also be incorporated as part of the polymerization feed stock to produce precoated polymer directly.

Well dispersed coatings of as little as 0.1–2.0 weight percent are sufficient to permit the full transformation to the $\gamma$ form. The solution coating process is the most economical technique to achieve this uniform coating.

While the final coating weight of less than 2% weight percent agent to polymer is all that is required, the most efficient techniques to achieve this end result is to coat from a solution in which the agent concentration is greater than 20%, relative to the inert liquid diluent. This stock solution can be repeatedly used to coat different batches of polymers since the concentration of the active agent decreases by only 1-2 parts per hundred parts of polymer.

As noted previously, the phase transformation of alpha poly(vinylidene fluoride) to the gamma form can be achieved by simply associating the polymer with any one or combination of the above catalytic materials, followed by controlled heating and then cooling. If necessary, as is often the case in non-porous films, this process can be repeated several times in order to achieve substantially complete conversion of the alpha form of the polymer to the corresponding gamma form. It is advisable between each recycling of the polymer to add supplementary quantities of phase transformation agents in order to insure saturation of the as yet unconverted alpha phase of the polymer.

While the precise mechanism associated with the phase transformation of the polymer and the role of the phase transformation in such conversion is not known, it is hypothesized that the presence of the PTA within the polymer during melting retards the diffusion of the melted polymer chains, allowing them to rearrange themselves in the more thermodynamically stable gamma form.

Subsequent to completion of the phase transformation of poly(vinylidene fluoride) to the gamma polymorph, the phase transformation catalyst can be diassociated therefrom by conventional solvent extraction techniques.

Figure 4:
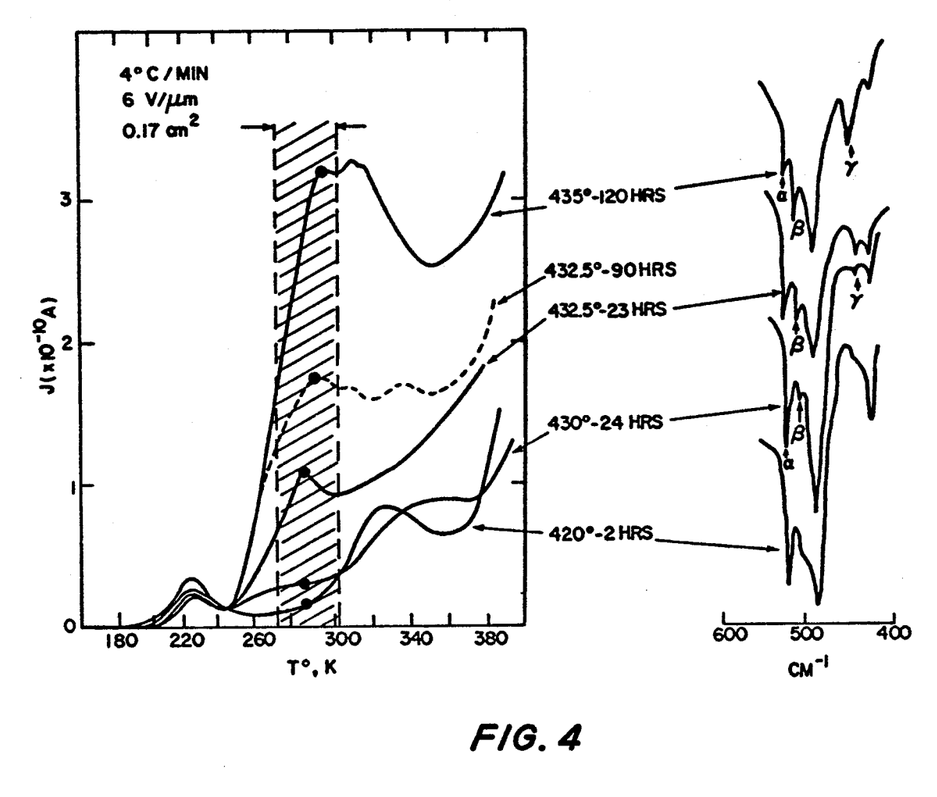
FIG. 4 shows the correlation between the appearance of the 430 cm$^{-1}$ $\gamma$ form band and the thermally stimulated current response (electret behavior) of the $PVF_2$ samples selected from the different temperature regions of FIG. 3.
Figure 5:
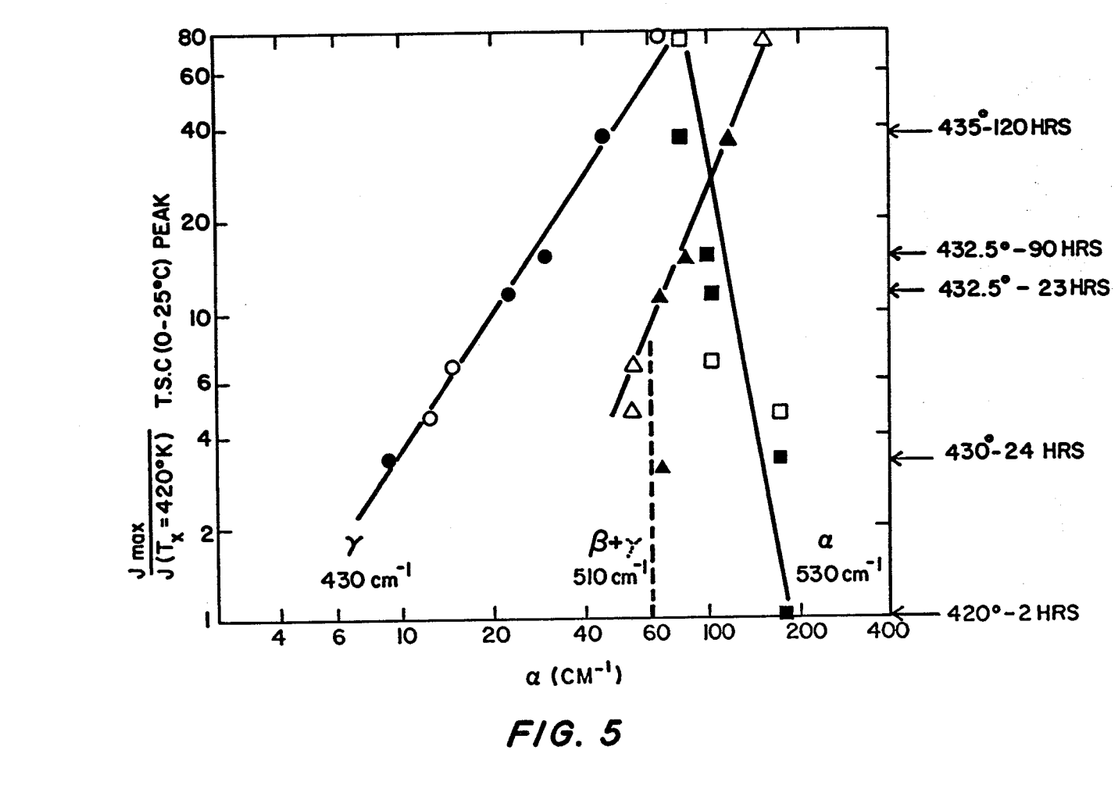
FIG. 5 shows the correlation between the magnitude of this current (electret behavior) and the amount of the $\gamma$ phase (the intensity coefficient of the 430 cm$^{-1}$ band).

The high $\gamma$ content, poly(vinylidene fluoride) samples prepared in the manner described hereinabove are identified by the presence of infrared absorptions at 430, 776, and 810 $cm^{-1}$. (These latter two bands may be obscured by $\alpha$ phase absorption bands in samples that have not been completely transformed.) Films prepared in this manner exhibit the extremely large room temperature current peak in thermally stimulated current experiments shown in FIG. 4. The magnitude of this current depends on the amount of the $\gamma$ form as shown in FIG. 5. As is apparent, materials prepared in this fashion are suitable for a variety of electrical applications, including the use of these materials as electrets.

The Examples which follow further define, describe and illustrate the processes of this invention. Apparatus and techniques used in such processes are standard or as hereinbefore described. Parts and percentages appearing in such examples are by weight unless otherwise stipulated.

EXAMPLE I

Preparation of films of gamma poly(vinylidene fluoride).

Two-tenths of a gram of Union Carbide organo-modified silicone surfactant, L-520, is combined with 1 gram of as received Kureha Chemical Company KF-1100 poly(vinylidene fluoride) powder and 50 milliters of of methanol. This slurry is stirred for about one minute and then allowed to settle. The aqueous phase of the slurry is then removed from the container by simply decanting the fluid and the powder which remains allowed to air dry. Subsequent solvent extraction showed that this process left less than about 1.8 percent of surfactant on the polymer.

Twenty milligrams of the treated poly(vinylidene fluoride) resin is placed in a cold (room temperature) one inch diameter cylindrical mold and the entire assembly placed in a Carver laboratory press that has been previously preheated to 473° K. A pressure of 2000 PSI is applied to the sample when it reaches 423° C. At 438° K, the pressure is released and the sample removed. The thermal inertia of the mold and the temperature of the press insure a slow heating rate (less than 3 Kelvin degrees per minute) through the melted region of the alpha phase.

Figure 1:
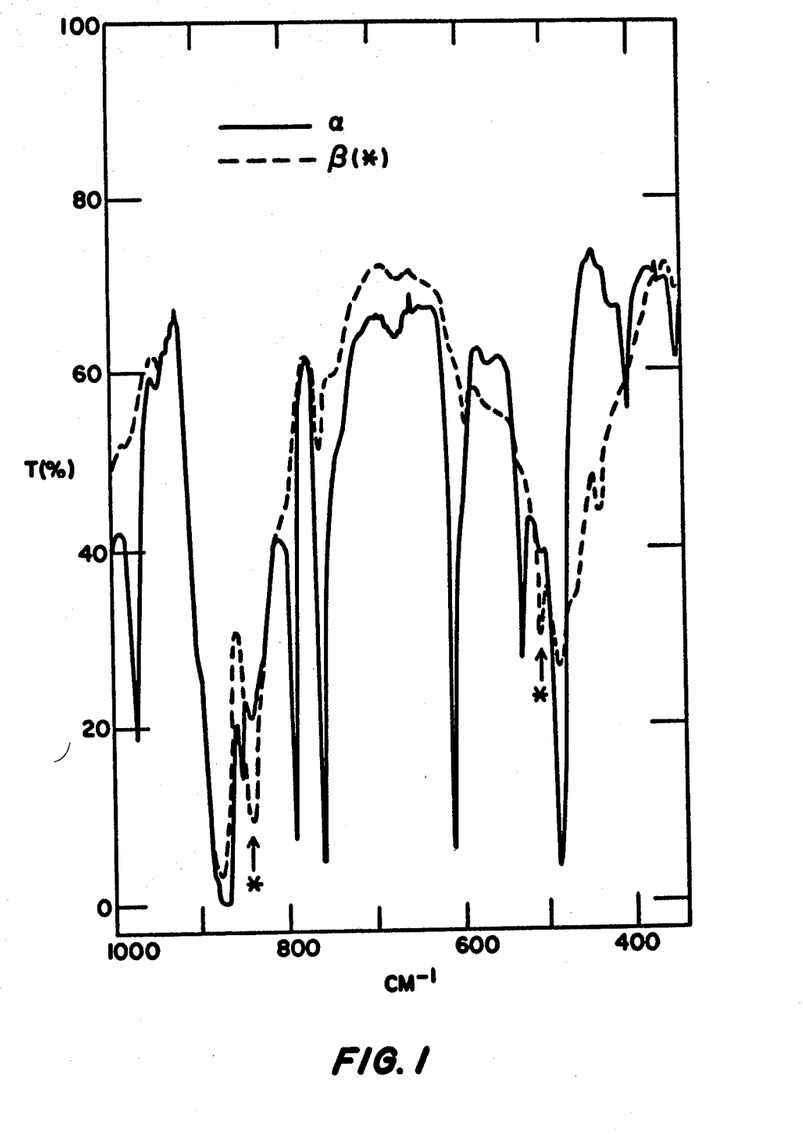
FIG. 1 shows the difference between the infrared spectra of the $\alpha$ and $\beta$ phases of $PVF_2$.
Figure 2:
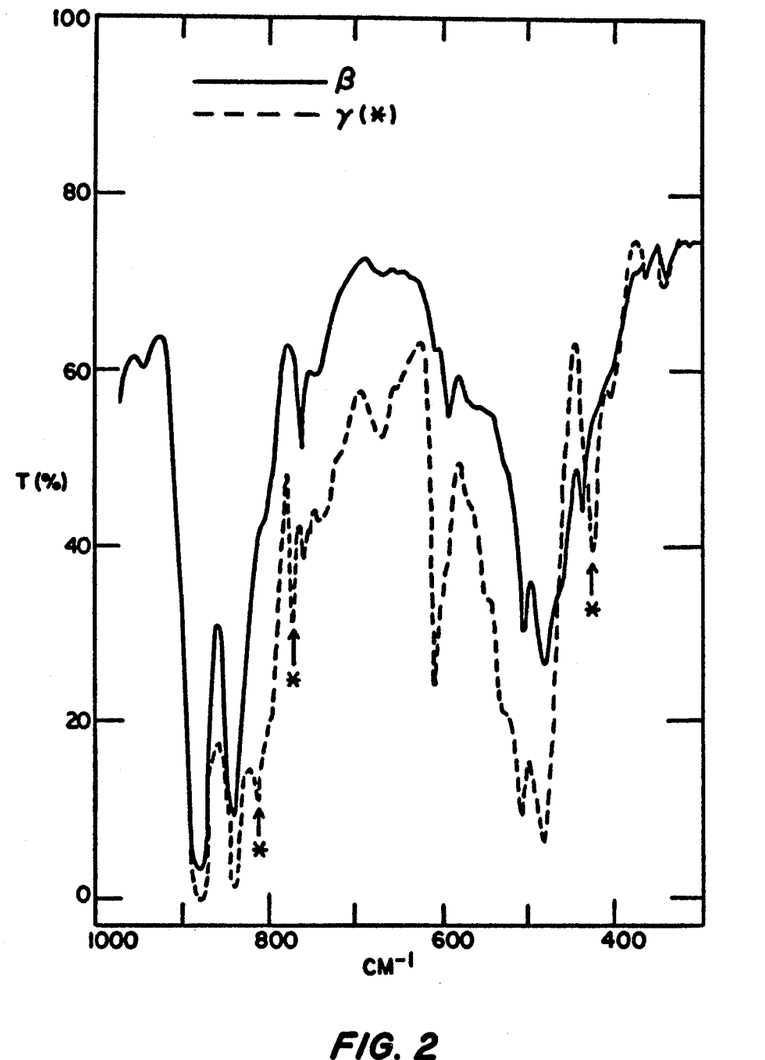
FIG. 2 illustrates the distinction between the vibrational spectra of the closely related $\beta$ and $\gamma$ forms.
Figure 3:
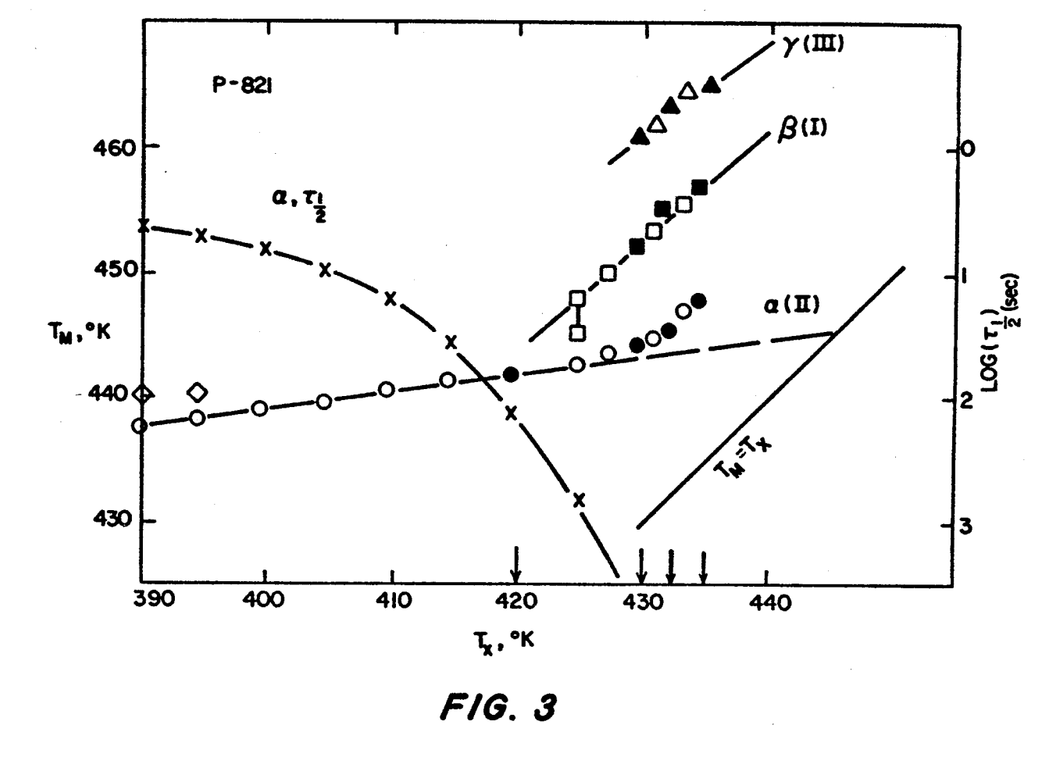
FIG. 3 shows the relationships between the endotherm peak melting temperatures and the isothermal crystallization temperature in a particular $PVF_2$ film, Kynar 821.

The absorption coefficient (base 10) of the gamma/[beta plus gamma] phase bands ($430cm^{-1}/570cm^{-1}$) were ($30cm^{-1}/84.2cm^{-1}$) in the treated film as opposed to ($4cm^{-1}/26cm^{-1}$) in the control (untreated) sample. This process also reduces the intensity of the alpha phase absorption ($530cm^{-1}$) from ($170cm^{-1}$ to $33cm^{-1}$). The corresponding room temperature thermally stimulated current peak (electret behavior) increased by a factor of 19. This phenomenal change in the electrical properties of the sample is illustrated in FIG. 2 of an article previously co-authored by the inventors of this process. Appl. Phys. Letters 27, 486–488 (1975).

EXAMPLE II

Preparation of films of gamma poly(vinylidene fluoride).

The mold used in Example I is greased with one drop (approximately 5 milligrams) of Union Carbide organo-modified silicone L-7607. Sufficient untreated, as received poly(vinylidene fluoride) powder (of the same type used in Example I) is added to the mold to make up approximately a 20 micron thick film (approximately 10 milligrams). The mold is then heated in the same manner described in Example I.

The resulting absorption coefficients of the gamma/[beta plus gamma]/alpha phase absorption bands at ($430cm^{-1}/510cm^{-1}/530cm^{-1}$) were ($25cm^{-1}/76cm^{-1}/18cm^{-1}$) in the treated film versus ($4cm^{-1}/27cm^{-1}/170cm^{-1}$) in the controlled sample. The room temperature stimulated current peak of the sample is increased by a factor of 14.

EXAMPLE III

Preparation of gamma phase films of poly(vinylidene fluoride) from films of the alpha phase of poly(vinylidene fluoride).

A 50 micron thick film of essentially pure alpha phase poly(vinylidene fluoride) is prepared by compression molding as received polymer resin (of the type identified in Example I) at 430° K. A thin film of Union Carbide organo-modified siloxane L-520 is applied to the polymer film. The sample, which is prepared in the manner described above, is placed between two glass slides and heated to 454° K at about 0.2 K° per minute in a Metler FP-2 to microscope hot stage, and then allowed to cool to room temperature. The resulting film has (gamma/[beta plus gamma]/alpha) phase absorption coefficients (as defined in Example II) of ($61cm^{-1}/226cm^{-1}/20cm^{-1}$). The room temperature thermally stimulated current peak is 100 times greater than that of the untreated film.

EXAMPLE IV

Example II is repeated except for the substitution of Union Carbide organo-modified silicon L-520 for Union Carbide organo-modified silicone L-7604. One additional variation involves the heating of the sample to an upper temperature of 5K° higher than that of the sample in Example II. The (gamma/[gamma plus beta]/alpha) absorption coefficients of this film are ($27cm^{-1}/78cm^{-1}/0cm^{-1}$) as opposed to ($4cm^{-1}/27cm^{-1}$ $^{/170}cm^{-1}$) in the control material. The room temperature thermally stimulated current peak is increased by a factor of 16. Note, that no alpha phase crystals are detectable in the treated film.

EXAMPLE V

The procedures of Example II are repeated except for the substitution of Union Carbide organo-modified silicone L-7002 for Union Carbide organo-modified silicone L-7607. The (gamma/[gamma plus beta]/alpha) absorption coefficients of this film are ($37cm^{-1}/46cm^{-1}/50cm^{-1}$) as opposed to ($4cm^{-1}/27cm^{-1}/170cm^{-1}$) for the control sample.

EXAMPLE VI

The procedures of Example II are repeated except for the substitution of Union Carbide organo-modified silicone L-720 for Union Carbide organo-modified silicone L-7607. The (gamma/[gamma plus beta]/alpha) absorption coefficients of this film are ($16cm^{-1}/49cm^{-1}/16cm^{-1}$) as opposed to ($4cm^{-1}/27cm^{-1}/170cm^{-1}$) for the control material.

EXAMPLE VII

The procedures of Example II are repeated except for the substitution of Union Carbide organo-modified silicone L-522 for Union Carbide organo-modified silicone L-7607. The (gamma/[gamma plus beta]/alpha) absorption coefficience of this film are ($11cm^{-1}/39cm^{-1}/45cm^{-1}$) as opposed to ($4cm^{-1}/27cm^{-1}/170cm^{-1}$) for the control material.

What is claimed is:

1. A process for enhancement in the electret behavior of poly(vinylidene fluoride), said process comprising:
   (a) providing a sample of poly(vinylidene fluoride), said sample comprising predominately the alpha and/or beta phase of said polymer;
   (b) contacting said sample with a phase transformation agent, said phase transformation agent comprising a block copolymer having at least one siloxane segment and at least one oxyalkylene segment the siloxane segment of said block copolymer comprising at least one trifunctional silicon atom and at least three difunctional silicon atoms,
   the trifunctional silicon atom being bonded to three oxygens and a single monovalent hydrocarbon radical and joined to the difunctional silicon atoms through oxysilicon bonds, the difunctional silicon atoms having bonded thereto two monovalent hydrocarbon radicals and the oxyalkylene segment of the block copolymer, the oxyalkylene segment of the block copolymer comprising at least five oxyalkylene groups bonded to one another by oxycarbon bonds and bonded at one end to the siloxane segment of the copolymer and encapped at the other end with a monoether radical;

(c) heating the sample of poly(vinylidene fluoride) either concurrent with or subsequent to contact with the phase transformtion under controlled conditions, whereby the temperature of the sample is elevated to 30K° below the point at which substantially all of alpha phase of the sample is melted and thereafter allowed to increase at rate of less than about 5K° per minute through the melt region of the polymer to a temperature about 5K° in excess of the peak endotherm of the alpha phase; and (d) cooling the sample sufficiently to result in its recrystallization to the gamma phase of the polymer.

2. The process of claim 1, wherein the phase transformation agent comprises at least one copolymer of the formula:

$(R')(SiO_3)_x(R_2SiO)_y[C_nH_{2n}O)_zR'']_a[R''']_{3x-a}$ where $x$ is the number of trifunctional silicon atoms bonded to a single monovalent or multivalent hydrocarbon radical, R';

$a$ is the number of poly(oxyalkylene) segments in the block copolymer;

$y$ is an integer having a value of at least 3 and denotes the number of difunctional siloxane units $n$ is an integer from 2 to 4 denoting the number of carbon atoms in the oxyalkylene group;

$z$ is an integer having a value of at least 5 and denotes the length of the oxyalkylene chain.

* * * * *